United States Patent [19]
Hayward et al.

[11] Patent Number: 5,341,269
[45] Date of Patent: Aug. 23, 1994

[54] VOLTAGE PROTECTOR AND GROUNDING BAR ARRANGEMENT FOR TERMINAL BLOCK

[75] Inventors: Gregory R. Hayward, Glenview; Bjarne Frederiksen, Villa Park, both of Ill.

[73] Assignee: Illinois Tool Works Inc., Glenview, Ill.

[21] Appl. No.: 923,249

[22] Filed: Jul. 31, 1992

[51] Int. Cl.$^5$ .................... H02H 1/04; H02H 3/22
[52] U.S. Cl. ...................... 361/119; 361/91; 361/111
[58] Field of Search .......... 361/56, 91, 111, 117, 361/118, 119, 728, 730, 823, 824, 833, 835, 837

[56] References Cited

U.S. PATENT DOCUMENTS

| | | | |
|---|---|---|---|
| 4,687,270 | 8/1987 | Plyler et al. | 361/834 |
| 4,846,735 | 7/1989 | Teichler et al. | 361/119 |
| 4,849,846 | 7/1989 | Hung et al. | 361/56 |
| 4,922,374 | 5/1990 | Mueller et al. | 361/119 |

*Primary Examiner*—A. D. Pellinen
*Assistant Examiner*—Ronald W. Leja
*Attorney, Agent, or Firm*—& Weinrieb Schwartz

[57] ABSTRACT

A voltage protector and ground bar arrangement is provided for use with a telephone terminal block having at least two rows of terminals which are spaced apart from each other so as to form an elongated opening therebetween, The arrangement includes a housing for receiving a voltage suppressor, four terminal/fuse contacts, and a ground contact, A plug-in fuse carrier is disposed in the upper fuse portion of the housing, A grounding bar is disposed within the elongated opening of the terminal block between the at least two rows of terminals and extends generally throughout the length of the terminal block. The ground contact includes prongs which extend vertically and externally of the housing for connection to a hole in the grounding bar.

20 Claims, 5 Drawing Sheets

FIG. 1

VOLTAGE PROTECTOR AND GROUNDING BAR ARRANGEMENT FOR TERMINAL BLOCK

FIELD OF THE INVENTION

This invention relates generally to transient voltage protector packages and more particularly, it relates to a voltage protector and grounding bar arrangement which includes a two-piece interfitting housing for receiving an overvoltage protection device having a ground contact, a grounding bar adapted to be mounted to a terminal block and connected to the ground contact, and a surge-current protector device mounted on the housing.

BACKGROUND OF THE INVENTION

Heretofore, there is known in the prior art of a plug-in fuse carrier operable as a surge-current protector for the cross-connection of two rows of terminals of a telephone terminal block, referred to as an AT&T Style 110 Block, and in common use in telephone and other electronic applications. Such a fuse carrier is illustrated and described in U.S. Pat. No. 4,968,264 to William E. Ruehl et al., which is assigned to the same assignee as the present invention. The fuse carrier is formed of an insulating housing 12 and a cover 14 mounted on the housing. The cover 14 includes a first platform 16 disposed at its one end and a second platform 18 disposed at its other end. The cover is positioned on the housing so as to enclose a cavity 20 in the housing. Fuses 22 and 24 of a tubular configuration are off-set mounted in the cavity so as to accommodate their protruding diameters and to minimize the space requirement within the cavity 20. Each of the fuses includes contact blades 32, 36 extending through aligned slits in the housing end walls for resting against an upright 88 and for providing a contact area in a gap 86 at each end of the fuse carrier. The fuse carrier is readily insertable between the two rows of the terminals of the terminal block so as to connect two circuits with the fuses 22, 24.

Accordingly, this prior art fuse carrier only provided for surge-current protection. However, it is also generally known that telephone circuits operate on relatively low voltages and are sometimes exposed to transient voltages of considerably higher levels than the normal operating voltages. This may be effected by a lightening strike, by a short circuit with a high voltage line, and by other causes. Therefore, it is also desirable to provide high transient voltage protection for the telephone circuitry.

While there are also known in the prior art of plug-in structures for use with telephone terminal blocks so as to provide connection thereto, including electrical components for protecting against high transient voltages, the present invention represents additional improvements over the prior art transient voltage protectors and the surge-current protector described in connection with the '264 patent.

Specifically, the present invention provides a voltage protector and grounding bar arrangement for use with a telephone terminal block which includes a two-piece interfitting housing for receiving an overvoltage protection device having a ground contact. A strip-like grounding bar has been designed for mounting into an existing unused opening appearing between two rows of terminals in the telephone terminal block and for connection to the ground contact. Further, the housing is of a unique construction for connecting the overvoltage protection device across opposed terminal pairs in the two rows of terminals in the telephone terminal block. The housing is also adapted to receive and connect a plug-in surge-current protector into the circuit.

OBJECTS OF THE INVENTION

Accordingly, it is a general object of the present invention to provide an improved voltage protector and grounding bar arrangement for a terminal block which is relatively simple and economical to manufacture and assemble.

It is another object of the present invention to provide a voltage protector and grounding bar arrangement for a terminal block which includes a two-piece interfitting housing for receiving an overvoltage protection device having a ground contact, a grounding bar adapted to be mounted to a terminal block and for connection to the ground contact, and a surge-current protector device mounted on the housing.

SUMMARY OF THE INVENTION

In a preferred embodiment of the present invention, there is provided a voltage protector and grounding bar arrangement for use with a telephone terminal block having at least two rows of terminals which are spaced apart from each other so as to form an elongated opening therebetween which comprises in combination a grounding bar, a housing, and a plug-in fuse carrier. The grounding bar is formed of an elongated flat horizontal member and a pair of end terminal portions connected to each end of the horizontal member. The grounding bar is disposed within the elongated opening between the at least two rows of terminals and extends generally throughout the length of the terminal block. The horizontal member has a plurality of holes. The housing is formed of a lower terminal portion, a middle body portion, and an upper fuse portion. A voltage suppressor is disposed within the middle body portion of the housing. A plurality of terminal/fuse contacts are also disposed within the middle body portion and extend between the lower terminal portion and the upper fuse portion of the housing.

A ground contact has a head portion which extends vertically inside the body portion between the lower terminal portion and the upper fuse portion of the housing for connection to or insertion within the voltage suppressor and has prongs thereof extending vertically and externally of the housing for connection to one of the plurality of holes in the grounding bar. The plug-in fuse carrier is disposed within the upper fuse portion of the housing. The lower terminal portion of the housing is disposed across opposed terminal pairs of the at least two rows of terminals for connection to the terminal/fuse contacts.

BRIEF DESCRIPTION OF THE DRAWINGS

These and other objects and advantages of the present invention will become more fully apparent from the following detailed description when read in conjunction in which the accompanying drawings with like reference numerals indicate corresponding parts throughout the several views and, wherein.

DESCRIPTION OF THE PREFERRED EMBODIMENT

Referring now in detail to the various views of the drawings and in particular to FIGS. 1 through 5, there is shown a voltage protector and grounding bar arrangement of the present invention which is designated generally by reference numeral 10 and is intended for physical and electrical association with a telephone terminal block, referred to as an AT&T Style 110 Block, which is in common use in telephone circuitry and other electronic applications. The terminal block 12 is formed with a number of rows 14a, 14b, 14c, and 14d. The two rows 14a and 14b are spaced apart from each other so as to form an elongated opening or channel 16 therebetween. Similarly, the two rows 14c and 14d are spaced apart from each other so as to form an elongated opening or channel 18 therebetween.

Figure 1:
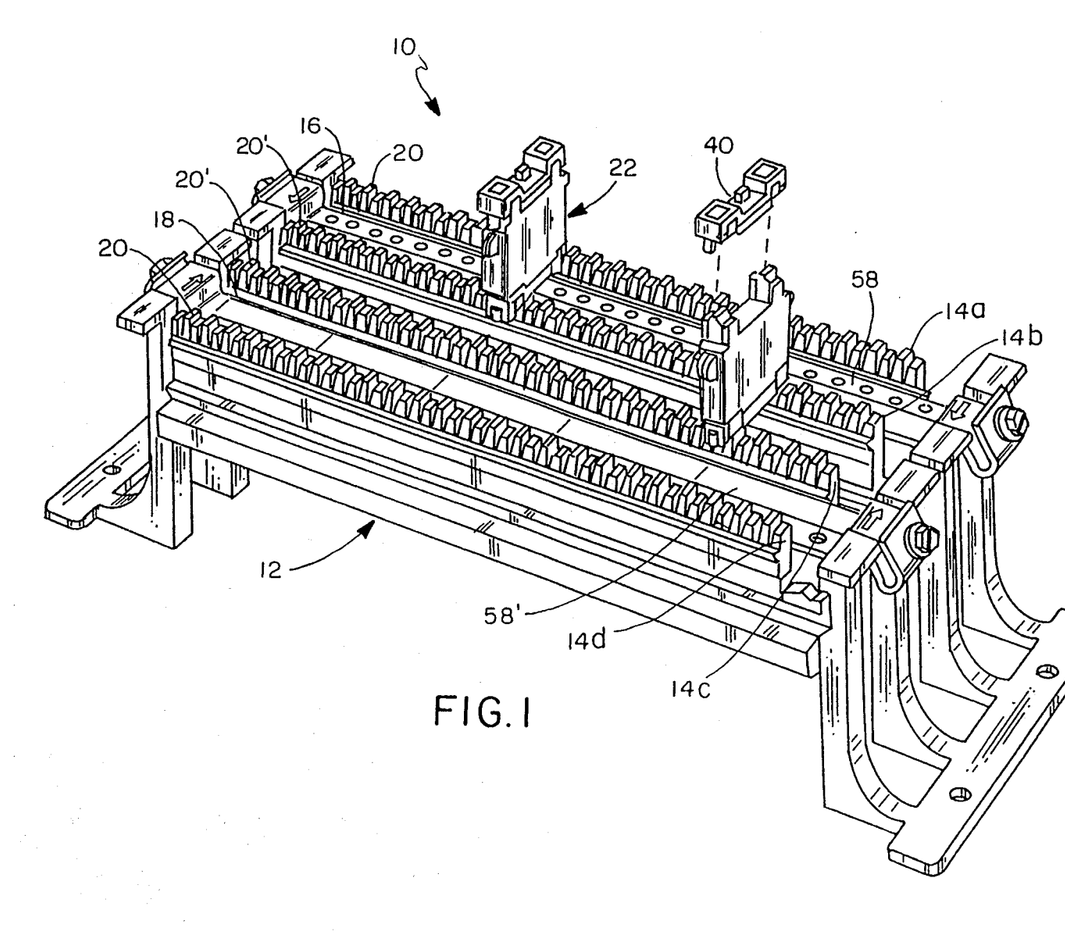
FIG. 1 is a perspective view of a voltage protector and grounding bar arrangement, constructed in accordance with the principles of the present invention.

Each of the rows 14a-14d is provided with a plurality of terminals 20 or 20'. The terminals 20 in the rows 14a and 14d are disposed in alignment with opposed terminals 20' in the corresponding rows 14b and 14c, respectively. Thus, each of the corresponding opposed terminals 20 and 20' define a terminal pair. The voltage protector and grounding bar arrangement 10 suitably interconnects with one of the opposed terminal pairs 20—20' in either of the two rows 14a, 14b or 14c, 14d.

Figures 1A, 2:
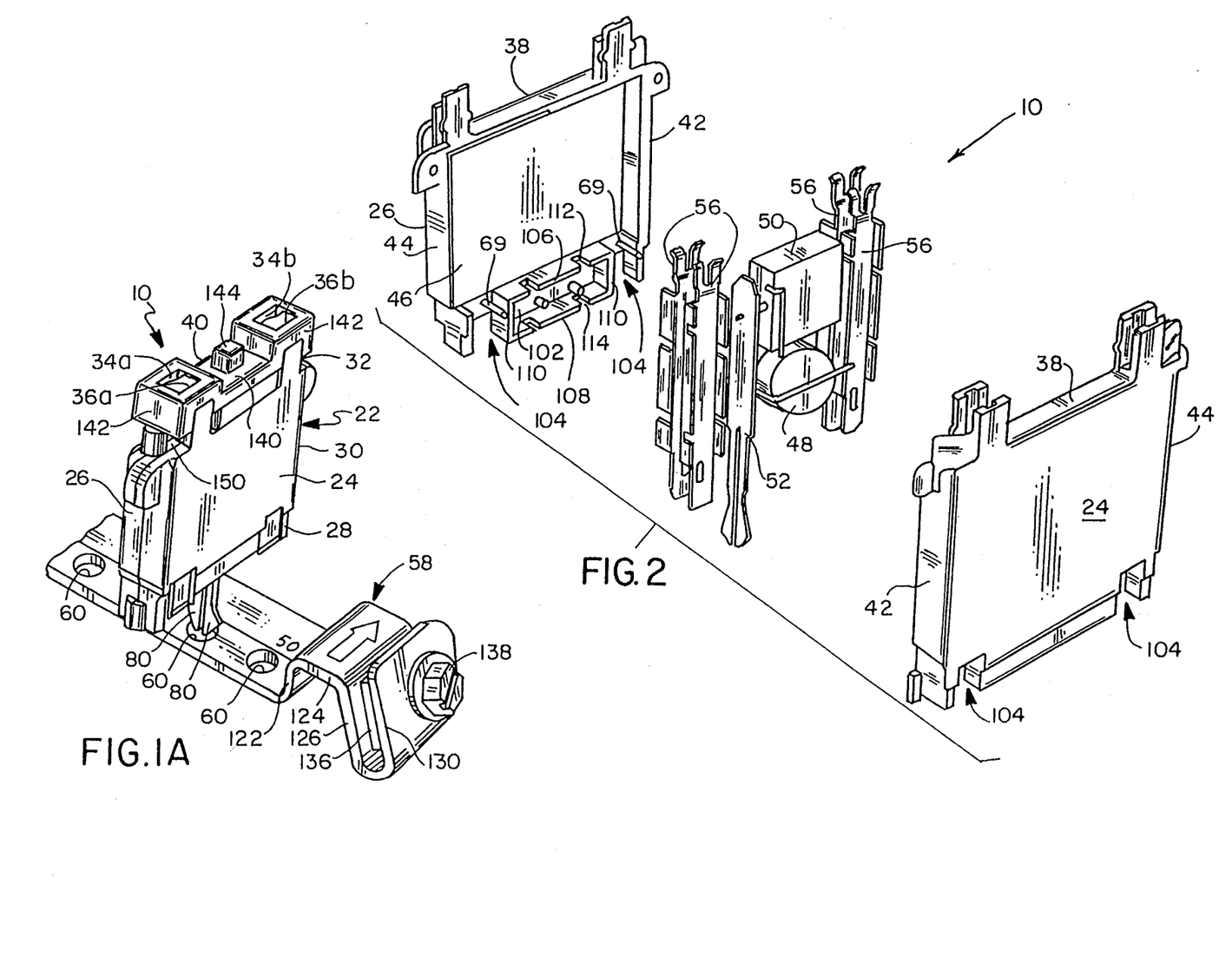
FIG. 1A is an enlarged view of a portion of the arrangement of FIG. 1.
FIG. 2 is an exploded perspective view of the voltage protector and grounding bar arrangement of FIG. 1, with the fuse carrier and grounding bar being removed.

The voltage protector and grounding bar arrangement 10 includes a plastic housing 22 made of a suitable material such as, for example, a fire-retardant polymer and is comprised of two co-mating front and back halves 24 and 26. The two halves are identical parts which are assembled to each other and are ultimately sonically welded together. The housing 22 includes a lower terminal portion 28, a middle body portion 30, and an upper fuse portion 32. The lower terminal portion 28 is adapted to be plugged into the AT&T Style 110 Block during use. The upper fuse portion 32 includes a first pair of opposed top recesses 34a, 34b and a second pair of opposed top recesses 36a, 36b. The adjacent recesses 34a and 36a are separated from the adjacent recesses 34b and 36b by means of a recessed central bridging portion 38. The top recesses 34a and 34b are provided for receipt of opposed contact blades of a first fuse disposed in a fuse carrier 40, and the top recesses 36a and 36b are provided for receipt of opposed contact blades of a second fuse disposed in the fuse carrier 40, as will be explained more fully hereinafter.

The front and back halves 24 and 26 are provided with outer confronting and interfitting wall members 42 and 44, respectively. The wall members 42 and 44 are recessed at 46 so as to receive and enclose a rectifying device such as a diode bridge rectifier 48 and a pair of voltage suppressors such as a sidactor or silicon avalanche suppressors 50, or any number of different single or combined components in order to create other products using the same housing. A ground contact 52 is provided for reasons that will become apparent which interconnect with the voltage suppressor 50 and which extends through the lower portion of the housing chamber 102 by means of suitable slots 114 formed therein. Adjacent each end wall 54 of the front and back halves 24 and 26, there are provided in the housing 22 four terminal/fuse contacts 56. A strip-like grounding bar 58 is adapted to fit within the elongated opening 16 defined between the two rows 14a and 14b of terminal block 12. Similarly, a strip-like grounding bar 58' is adapted to fit within the elongated opening 18 defined between the two rows 14c and 14b of terminal block 12. Each of the grounding bars 58 and 58' is provided with a plurality of openings 60 for receiving therein the prong-like ends of the corresponding ground contact 52.

Figure 3:
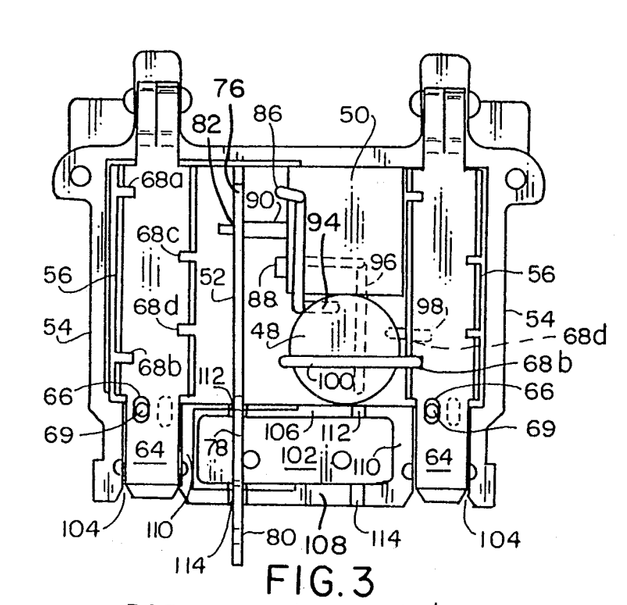
FIG. 3 is a front view of the back half assembled with certain components of the arrangement of FIG. 2.
Figure 4:
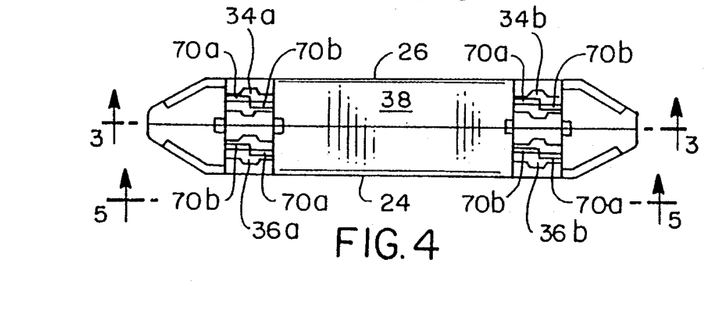
FIG. 4 is a top view, taken along the lines 4—4 of FIG. 5.
Figure 5:
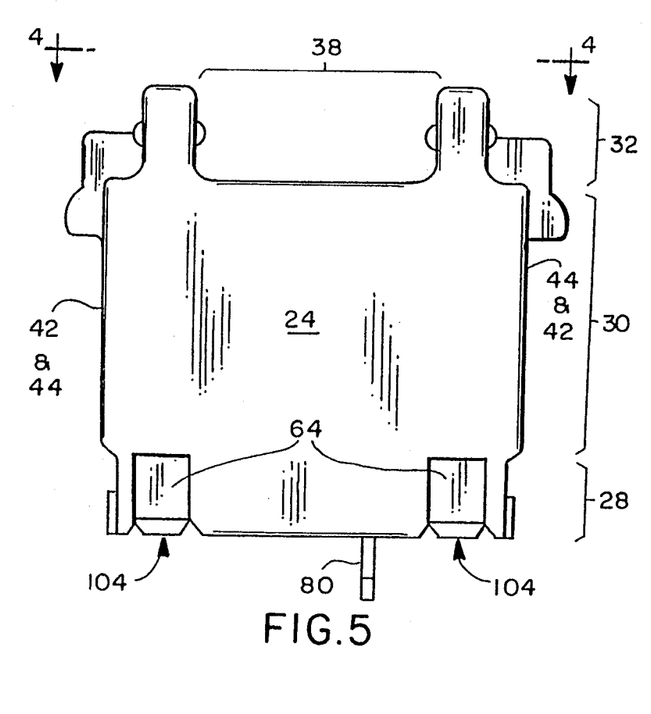
FIG. 5 is a front view, taken along the lines 5—5 of FIG. 4.
Figure 6:
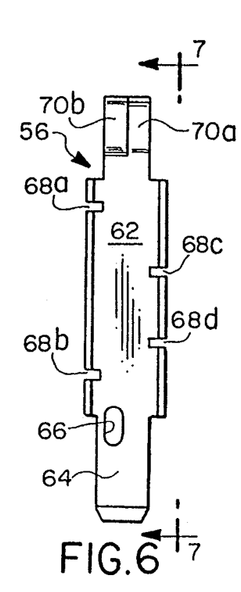
FIG. 6 is a front view of the terminal/fuse contact forming a part of the present invention.
Figure 7:
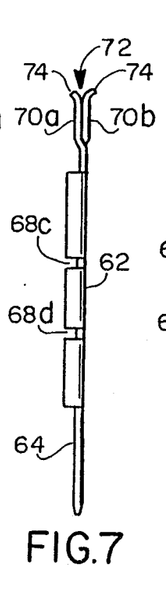
FIG. 7 is a side view of the terminal fuse contact of FIG. 6, taken along the lines 7—7 of FIG. 6.
Figure 8:
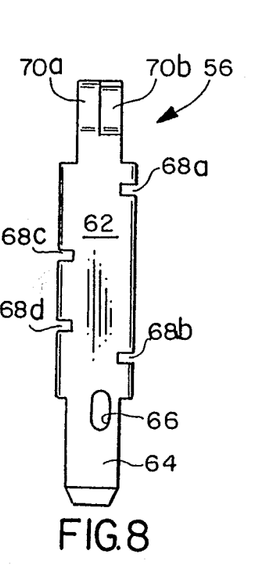
FIG. 8 is a back view of the terminal/fuse contact of FIG. 6.

The terminal/fuse contacts 56 shown in FIGS. 2, 3 and 5 are all identical and one of them is shown in full detail in FIGS. 6-8. The terminal/fuse contacts are preferably formed from phosphor-bronze strip metal and are tin plated for solderability. Each of the terminal/fuse contacts comprises an integral sheet metal stamping and includes a flat body portion 62 having a narrower leg 64 extending integrally and downwardly therefrom. The leg 64 has an oval-shaped mounting aperture 66. The body portion 62 is formed with an upper horizontally-extending slit 68a and a lower horizontally-extending slit 68b on its left side thereof for receiving therein terminal leads of electrical components.

The body portion is also formed with an upper horizontally-extending slit 68c and a lower horizontally-extending slit 68d on its right side thereof for receiving therein terminal leads of electrical components. At the opposite or upper edge of the flat body portion 62, there are provided two off-set strips 70a and 70b which are spaced apart from each other so as to form a fuse-blade receiving opening 72 therebetween. Each of the off-set strips has an outwardly deflected tip 74 to serve as a lead-in for the fuse blade contacts.

Figure 9:
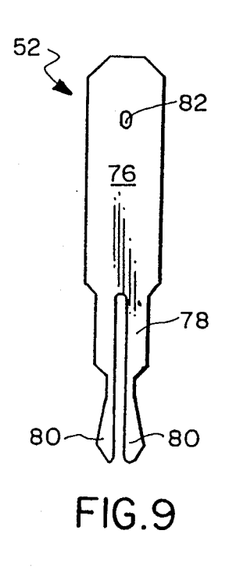
FIG. 9 is a front view of the ground contact.
Figure 10:
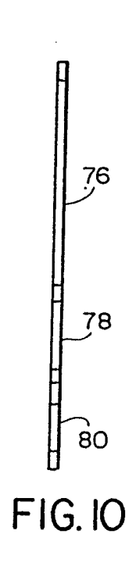
FIG. 10 is a side view of the ground contact of FIG. 9.
Figure 11:
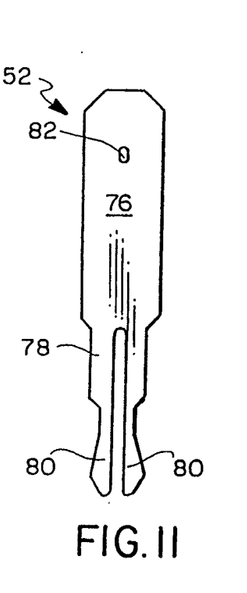
FIG. 11 is a back view of the ground contact of FIG. 9.

The ground contact 52 is stamped from non-ferrous sheet metal and is likewise made from a phosphor-bronze strip metal similar to the terminal/fuse contact 56 and is tin plated for solderability. The ground contact 52 is shown in FIGS. 2, 3 and 5 and is illustrated in full detail in FIGS. 9-11. In the latter, the ground contact 52 can be seen to include a rectangularly-shaped head portion 76, a neck portion 78 extending from one end of the head portion, and a pair of spaced-apart prongs 80 extending from the other end of the neck portion. The head portion includes an opening 82 formed in its upper section for receiving a terminal lead of an electrical component. The ground contact extends vertically inside of the middle body portion 30 between the lower terminal portion 28 and the upper fuse portion 32 of the housing 22.

The transient voltage suppressor 50 such as, for example, a sidactor or silicon avalanche suppressors, has terminal pin leads 86, 88, and 90. The rectifying device 48, such as, for example, the diode bridge rectifier, has its terminal leads 94 and 96 connected by solder to the respective terminal pin leads 86 and 88 of the voltage suppressor 50 and has its terminal leads 98 and 100 received in the respective slits 68d and 68b of the terminal/fuse contacts and are soldered thereto. The terminal pin lead 90 of the voltage suppressor 50 is extended through the opening 82 in the head portion 76 of the ground contact 52 and is soldered thereto.

The lower terminal portion 28 of the housing 22 includes a chamber 102 disposed between open vertical cavities 104 formed on each side of the chamber 102. The narrower legs 64 of the four terminal/fuse contacts 56 are received within the two cavities 104. It will be noted that terminal/fuse contact stand-offs 69 formed on the housing 22 extend through the apertures 66 in the corresponding legs 64 of the contacts 56 so as to maintain the opposed contacts separated from each other. The chamber 102 is defined by an upper wall 106, a lower wall 108, and end walls 110. The upper wall 106 has slots 112 formed therein, and the lower wall 108 has slots 114 formed therein which are vertically aligned with the slots 112. The neck portion 78 of the ground contact 52 is positioned in the chamber 102 so that its upper and lower ends thereof extend through the respective slots 112 and 114. Also, the head portion 76 of the ground contact 52 is captivated between the interior walls of the bridging portion 38 and the chamber upper wall 106. As a result, the ground contact 52 is retained in the housing against vertical or lateral movement. It will be noted that the two prongs 80 of the ground contact extend vertically through the slot 114 and downwardly therefrom in order to engage in an offset manner the holes 60 in the grounding bar 58.

Figure 12:
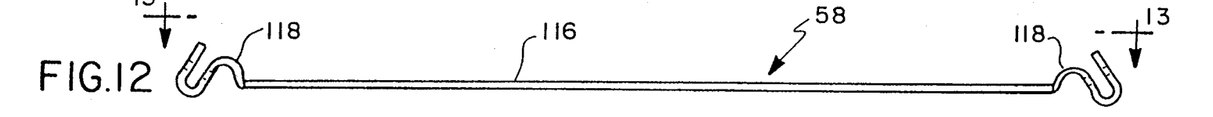
FIG. 12 is a side view of the grounding bar forming a part of the present invention.
Figure 13:
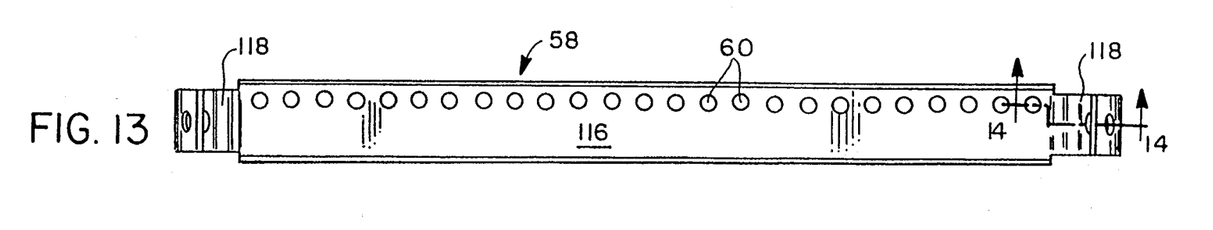
FIG. 13 is a top view of the grounding bar of FIG. 12, taken along the lines 13—13 of FIG. 12.
Figure 14:
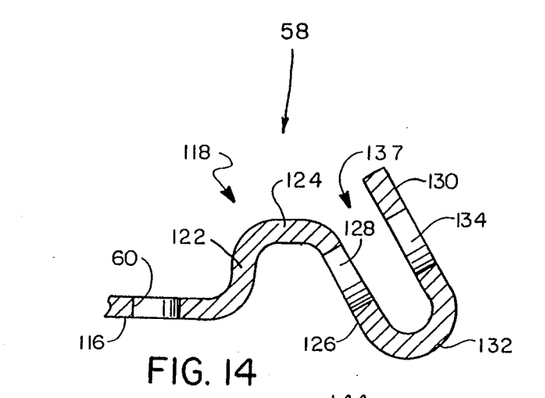
FIG. 14 is a cross-sectional view of a portion of the grounding bar of FIG. 12, taken along the lines 14—14 of FIG. 13.

The grounding bar 58 is fabricated from copper or other non-ferrous metal strip and is formed as is shown in FIGS. 1 and 1A and is illustrated in full detail in FIGS. 12-14. The grounding bar includes an elongated flat horizontal member or portion 116 and a pair of end terminal portions 118 connected to each end of the horizontal member. The horizontal member 116 has a plurality of aligned offset holes 60 for receiving therein the two prongs 80 of the ground contact 52, as can best be seen in FIG. 1A. The grounding bar 58 is disposed within the channel 16 (18) between the two rows 14a and 14b (14c and 14d) and extends generally throughout the length of the telephone terminal block 12.

As can best be seen in FIG. 14, the end terminal portion 118 has a vertical offset 122 which is interposed between protuberances of terminal block 12 and is integrally connected to the end of the horizontal member 116. At the upper end of the offset 122, there is connected integrally thereto a horizontal top wall 124 which rests on top of the same protuberances of terminal block 12 and extends outwardly therefrom. A first angularly-disposed connecting flange 126 is joined integrally to the outer end of the top wall 124 and extends downwardly therefrom. The connecting flange 126 has a central aperture 128. A second angularly-disposed connecting flange 130 is disposed parallel to and spaced apart from the first angularly-disposed connecting flange 126 and is connected integrally to the lower end of the connecting flange 126 by means of a U-shaped connecting portion 132. A central aperture 134 is provided within the second connecting flange 130 which is aligned with the aperture 128.

A square nut 136 is received within the slot 137 or area defined between the first and second angularly-disposed connecting flanges 126 and 130. A screw 138 extends initially through the aperture 134 in the second flange 130 and is threaded through the nut 136. Then, the screw 138 extends through the aperture 128 in the first flange 126 so as to captivate the square nut 136. A common ground bus wire (not shown) may be readily connected to the head of the screw 138 on either end 118 of the grounding bar 58.

Figure 15:
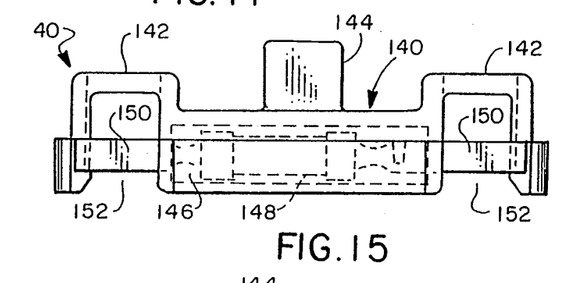
FIG. 15 is a side view of the fuse carrier forming a part of the present invention.
Figure 16:
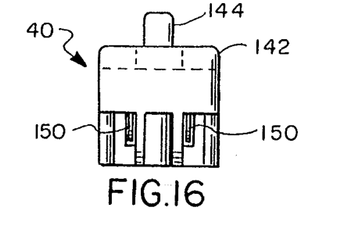
FIG. 16 is an end view of the fuse carrier of FIG. 15.

The fuse carrier 40 shown generally in FIGS. 1 and 1A is depicted in more detail in FIGS. 15 and 16. It should be clear that the fuse carrier is designed for plug-in assembly within the upper fuse portion 32 of the housing 22. Specifically, the fuse carrier 40 includes a central body portion 140 and a pair of platforms 142 connected to each end of the body portion 140. The body portion 140 includes on its top surface a handle member 144 so as to give a user a grip for handling, removal from, or insertion into the central bridging portion 38 in the upper fuse portion 32 of the housing 22. The body portion 140 includes a cavity 146 for receiving and retaining a pair of fuses 148 (one of which is shown in FIG. 15). Each of the fuses 148 includes oppositely extending blade contacts 150 having a contact area formed in a gap 152 within the respective flat platforms 142. The contact area of the respective blade contact 150 on the two fuses 148 is received in a snug engagement arrangement within the corresponding fuse-blade receiving openings 72 defined within the terminal/fuse contacts 56 when the fuse carrier 40 is inserted into the recesses 34a, 34b, and 36a, 36b. For a complete description of the details of the fuse carrier 40, reference is made to the aforementioned U.S. Pat. No. 4,968,264.

Figure 17:
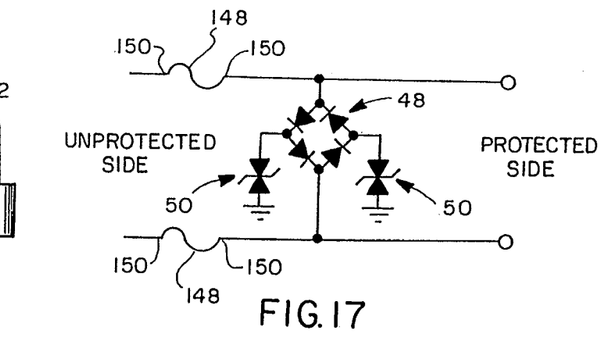
FIG. 17 is a schematic circuit diagram of the invention of FIG. 1.

The four terminal/fuse contacts 56, ground contact 52, voltage suppressors 50, and rectifying device 48 are all assembled together into a sub-assembly as shown in FIG. 2 and is then positioned between the two halves 24 and 26 of the housing 22. Next, the halves 24 and 26 are brought together so as to sandwich the sub-assembly therebetween. A sonic welding process is used to fixedly secure the two halves of the housing together. The fuse carrier 40 is installed within the recesses in the upper fuse portion 32 of the housing 22. Finally, two prongs 80 of the ground contact 52 extending externally and vertically from the lower terminal portion of the housing 22 is inserted into one of the opening 60 in the horizontal member 116 of the ground bar 58 which is mounted in the telephone terminal block 12. As a result, the voltage protector and grounding bar arrangement 10 of FIG. 1 is thus formed and is illustrated in the schematic circuit diagram of FIG. 17.

From the foregoing detailed description, it can thus be seen that the present invention provides a voltage protector and grounding bar arrangement for use with a telephone terminal block having at least two rows of terminals which are spaced apart from each other so as to form an elongated opening therebetween. The arrangement includes a two-piece interfitting housing for receiving an overvoltage protection device having a ground contact, a grounding bar adapted to be mounted to the terminal block and for connection to the ground contact, and a fuse carrier mounted in the upper portion of the housing. The grounding bar is formed of an elongated flat horizontal member and a pair of end terminal portions connected to each end of the horizontal member. The grounding bar is disposed within the elongated opening between the at least two rows of terminals of the terminal block and extends generally throughout the length of the terminal block. The horizontal member includes a plurality of aligned offset holes for receiving therein the prongs of the ground contact.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. In combination, a voltage protector and grounding bar arrangement, and a telephone terminal block, comprising:
   a telephone terminal block having at least two rows of terminals which are laterally spaced apart with respect to each other so as to form a longitudinally extending channel therebetween;
   a grounding bar disposed within said longitudinally extending channel defined between said at least two rows of terminals of said terminal block and having a plurality of holes defined therein;
   a housing;
   voltage suppressor means disposed within said housing;
   a plurality of terminal/fuse contacts disposed within laterally spaced portions of said housing for mating with opposed terminals of said at least two rows of laterally spaced terminals of said terminal block, disposed upon opposite sides of said longitudinally extending channel, when said housing is mounted upon said terminal block;
   ground contact means disposed within said housing and between said laterally spaced terminal/fuse contacts for connection to said voltage suppressor means and to one of said plurality of holes defined within said grounding bar disposed within said longitudinally extending channel of said terminal block defined between said laterally spaced rows of terminals; and
   plug-in fuse carrier means, having fuse means carried therein, removably disposed upon said housing for connecting to said plurality of terminal/fuse contacts.

2. A voltage protector and grounding bar arrangement as claimed in claim 1, wherein said housing includes a pair of co-mating front and back halves.

3. A voltage protector and grounding bar arrangement as claimed in claim 1, further comprising rectifying means disposed within said housing.

4. A voltage protector and grounding bar arrangement as claimed in claim 1, wherein said voltage suppressor means comprises silicon avalanche suppressors.

5. A voltage protector and grounding bar arrangement as claimed in claim 3, wherein said rectifying means comprises a diode bridge rectifier.

6. A voltage protector and grounding bar arrangement as claimed in claim 1, wherein each one of said terminal/fuse contacts is formed of a flat body portion, a narrow leg, and two offset strips, all integrally connected together.

7. A voltage protector and grounding bar arrangement as claimed in claim 6, wherein said narrow leg extends into cavity means in a lower terminal portion of said housing for connection to a corresponding terminal in said at least two rows of terminals.

8. A voltage protector and grounding bar arrangement as claimed in claim 6, wherein said two offset strips are spaced apart from each other so as to form a fuse-blade receiving opening therebetween for receipt of a corresponding fuse blade extending from said fuse carrier means.

9. A voltage protector and grounding bar arrangement as claimed in claim 1, wherein a head portion of said ground contact means is provided with an opening for receiving therein a terminal lead of said voltage suppressor means.

10. In combination, a voltage protector and grounding bar arrangement, and a telephone terminal block, comprising:
    a telephone terminal block having at least two rows of terminals which are laterally spaced apart with respect to each other so as to form a longitudinally extending channel therebetween;
    grounding bar means disposed within said longitudinally extending channel defined between said at least two rows of terminals of said terminal block and having at least one hole defined therein;
    a housing;
    voltage suppressor means disposed within said housing;
    a plurality of terminal/fuse contacts disposed within laterally spaced portions of said housing for mating with opposed terminals of said at least two rows of laterally spaced terminals of said terminal block, disposed upon opposite sides of said longitudinally extending channel, when said housing is mounted upon said terminal block;
    ground contact means disposed within said housing and between said laterally spaced terminal/fuse contacts for connection to said voltage suppressor means and to one of said at least one hole defined within said grounding bar means disposed within said longitudinally extending channel of said terminal block defined between said laterally spaced rows of terminals; and
    plug-in fuse carrier means, having fuse means carried therein, removably disposed upon said housing for connecting to said plurality of terminal/fuse contacts.

11. A voltage protector and grounding bar arrangement as claimed in claim 10, wherein said housing includes a pair of identical co-mating front and back halves.

12. A voltage protector and grounding bar arrangement as claimed in claim 10, further comprising rectifying means disposed within said housing.

13. A voltage protector and grounding bar arrangement as claimed in claim 10, wherein said voltage suppressor means comprises silicon avalanche suppressors.

14. A voltage protector and grounding bar arrangement as claimed in claim 12, wherein said rectifying means comprises a diode bridge rectifier.

15. A voltage protector and grounding bar arrangement as claimed in claim 10, wherein each one of said terminal/fuse contacts is formed of a flat body portion, a narrow leg, and two offset strips, all integrally connected together.

16. A voltage protector and grounding bar arrangement as claimed in claim 15, wherein said narrow leg extends into cavity means in a lower terminal portion of said housing for connection to a corresponding terminal in said at least two rows of terminals.

17. A voltage protector and grounding bar arrangement as claimed in claim 15, wherein said two offset strips are spaced apart from each other so as to form a fuse-blade receiving opening therebetween for receipt of a corresponding fuse blade extending from said fuse carrier means.

18. A voltage protector and grounding bar arrangement as claimed in claim 10, wherein a head portion of said ground contact means is provided with an opening for receiving therein a terminal lead of said voltage suppressor means.

19. In combination, a voltage protector and grounding bar arrangement, and a telephone terminal block, comprising:

a telephone terminal block having at least two rows of terminals which are laterally spaced apart with respect to each other so as to form a longitudinally extending channel therebetween;

grounding bar means disposed within said longitudinally extending channel defined between said at least two rows of terminals of said terminal block and having at least one hole defined therein;

a housing;

voltage suppressor means disposed within said housing;

terminal/fuse contact means disposed within laterally spaced portions of said housing for mating with opposed terminals of said at least two rows of laterally spaced terminals of said terminal block; disposed upon opposite sides of said longitudinally extending channel, when said housing is mounted upon said terminal block so as to overlie said terminal block and extend across said longitudinally extending channel and between said at least two rows of laterally spaced terminals;

ground contact means disposed within said housing and between said laterally spaced terminal/fuse contacts for connection to said voltage suppressor means and to said at least one hole defined within said grounding bar means disposed within said longitudinally extending channel of said terminal block defined between said laterally spaced rows of terminals; and plug-in fuse carrier means, having fuse means carried therein, removably disposed upon said housing for connecting to said terminal/fuse contact means.

20. A voltage protector and grounding bar arrangement as claimed in claim 19, further comprising rectifying means disposed within said housing.

* * * * *